United States Patent [19]

Brodrecht et al.

[11] Patent Number: 4,686,817
[45] Date of Patent: Aug. 18, 1987

[54] BALE BAGGING APPARATUS

[76] Inventors: Gerald L. C. Brodrecht, R.R. #1; Rueben Halwa, Box 68; both of Thorsby, Alberta, Canada T0C 2P0

[21] Appl. No.: 846,678

[22] Filed: Apr. 1, 1986

[51] Int. Cl.⁴ .............................................. B65B 9/00
[52] U.S. Cl. ......................................... 53/567; 53/576
[58] Field of Search ......................... 53/567, 576, 459

[56] References Cited

U.S. PATENT DOCUMENTS

| | | | |
|---|---|---|---|
| 2,982,068 | 5/1961 | Pape | 53/567 |
| 3,557,526 | 1/1971 | Hartmann | 53/567 |
| 3,662,514 | 5/1972 | Goss | 53/567 X |
| 4,594,836 | 6/1986 | Good | 53/576 X |

FOREIGN PATENT DOCUMENTS 2136761 9/1984 United Kingdom .................. 53/576

Primary Examiner—John Sipos
Attorney, Agent, or Firm—Harold H. Dutton, Jr.; George H. Dunsmuir

[57] ABSTRACT

An apparatus for loading a row of round bales into an elongated plastic bag includes a front frame for bearing against the front end of the row of bales, and a rear frame which is placed at the rear end of the row of bales. The rear frame includes a chute for guiding the bales into a bag mounted on a cylinder, which is pivotally mounted on the rear frame, and a pair of skids with pulleys on the front ends thereof. The ends of a cable are connected to the sides of the front frame, and the cable extends rearwardly around the pulleys on the rear frame and then forwardly to a towing vehicle. Forward movement of the vehicle causes movement of the rear frame towards the front frame, whereby the chute moves beneath the bales and the bag is moved forwardly around the bales.

5 Claims, 6 Drawing Figures

BALE BAGGING APPARATUS

BACKGROUND OF THE INVENTION

This invention relates to a bale bagging apparatus, and in particular to an apparatus for inserting round bales of hay or the like into a bag.

Presently available devices for inserting a hay bale into a bag are somewhat cumbersome and unduly complicated. Such devices rely on some form of plunger, which is actuated by a fluid operated piston/cylinder arrangement to push the bales into the bag.

The object of the present invention is to overcome the problems inherent in the above described devices by providing a relatively simple bale bagging apparatus, which does not rely on fluid-operated cylinders. More specifically, the apparatus of the present invention moves a bag around the bales rather than vice versa.

BRIEF SUMMARY OF THE INVENTION

Accordingly, the present invention relates to an apparatus for loading a bale into an elongated plastic bag comprising front frame means for abutting the front end of the bales; rear frame means for carrying the plastic bag in a forwardly opening position for receiving said bale; pulley means on said rear frame means; and connector means on said front frame means for connecting a cable to said front frame means, whereby when the cable is passed from said connector means around said pulley means and pulled towards said front frame means, the rear frame means is caused to move towards said front frame means to pull the bag around the bale.

BRIEF DESCRIPTION OF THE DRAWING

The invention will now be described in greater detail with reference to the accompanying drawings, which illustrate a preferred embodiment of the invention, and wherein.

DESCRIPTION OF THE PREFERRED EMBODIMENT(S)

Figure 2:
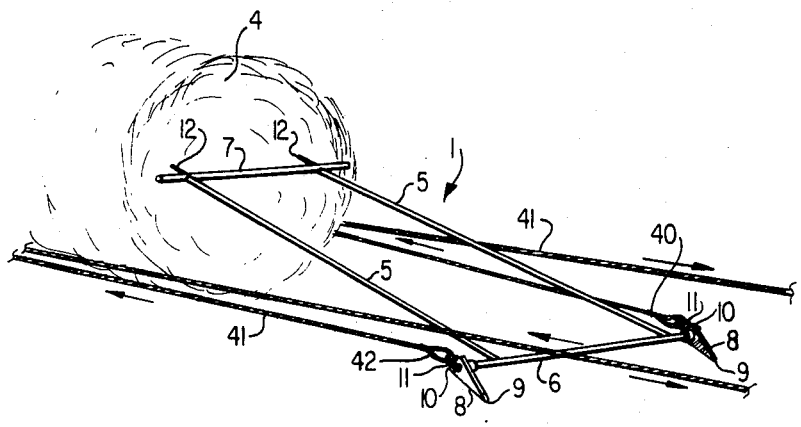
FIG. 2 is a perspective view of a front frame of the apparatus of FIG. 1.
Figure 3:
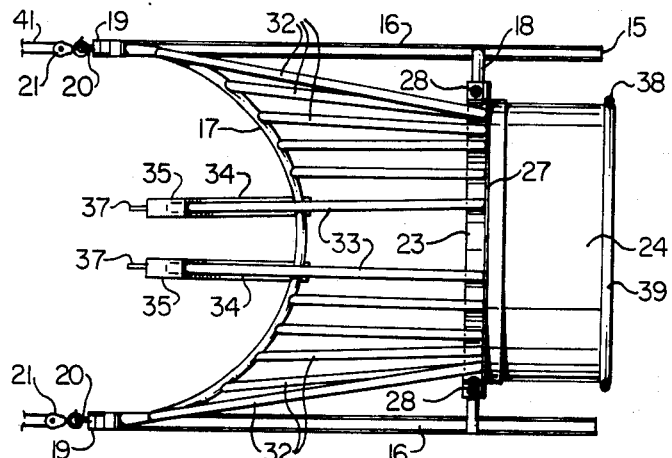
FIG. 3 is a plan view of a rear frame of the apparatus of FIG. 1.
Figure 4:
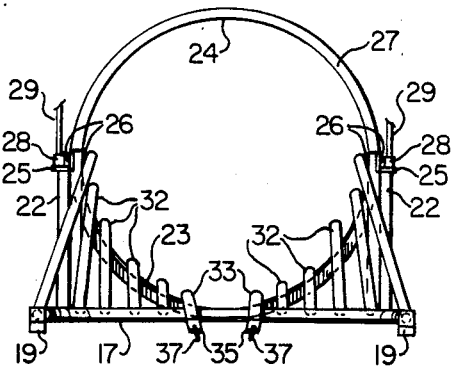
FIG. 4 is a front view of the frame of FIG. 3.
Figure 5:
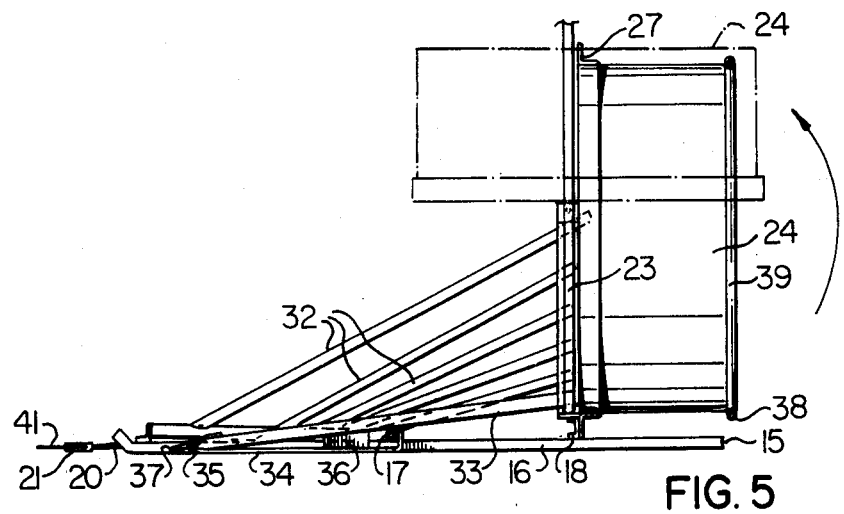
FIG. 5 is a side view of the frame of FIGS. 3 and 4.

With reference to the drawings, the basic elements of the apparatus of the present invention include a front frame generally indicated at 1 and a rear frame generally indicated at 2. The front frame 1 is intended to bear against the front end 3 of a row of round bales 4 of hay or straw for preventing forward movement of such bales. The front frame 1 is defined by short lengths of pipe which are welded together to define a rectangle. The frame 1 includes a pair of longitudinally extending sides 5 which are interconnected at their ends by front and rear crossbars 6 and 7, respectively. The crossbars 6 and 7 extend outwardly beyond the ends of the parallel sides 5. A tooth 8 is mounted on each end of the front crossbar 6. The tooth 8 (FIG. 2) has a pointed lower end 9 and a square top end 10 for receiving a U-shaped shackle 11. A pair of pins 12 defined by short lengths of rod extend rearwardly from the rear crossbar 7 for penetrating the front end 3 of the row of round hay bales 4.

Referring to FIGS. 3 through 6, the rear frame 2 includes a generally rectangular base 15 defined by a pair of skids 16 interconnected by an arcuate front crossbar 17 and a straight rear crossbar 18. The front ends 19 of the skids 16 are bent upwardly for facilitating sliding towards the front frame 1. A loop 20 is mounted on the front end 19 of each skid 16 for connecting a pulley 21 to the slide. A pair of spaced apart posts 22 are mounted on rear crossbar 18. A semi-circular, upwardly opening support 23 extends between the top ends of the posts 22. A sleeve 24 is pivotally mounted on the top ends of the posts 22 for rotation between the vertical and horizontal positions shown in solid and phantom outline, respectively in FIG. 5. For such purpose, a generally L-shaped bracket 25 (FIG. 4) is mounted on the top end of each post 22. A pair of lugs 26 defining a clevis extend outwardly from opposite sides of a flange 27 on one end of the sleeve 24 for mounting on the vertical arm of the bracket 25. A short sleeve 28 is mounted on each horizontal arm of the bracket 25 for receiving a second post 29. As described in greater detail hereinafter, in use, a shaft 30 carrying a rolled-up plastic bag 31 is mounted in the top ends of the posts 29.

A plurality of inclined tubes 32 and 33 defining a bale guide chute extend between the support 23 and the front crossbar 17. The central tubes 33 extend forwardly beyond the crossbar 27, and skids 34 are mounted on the outer ends thereof. The front ends 35 of the skids 34 are wrapped around the bottom ends of the tubes 33, and a reinforcement plate 36 extends between the tube 33 and the rear end of each skid 34. The rear end of each skid 34 extends upwardly, and is connected to the front crossbar 17. A pin 37 extends forwardly and downwardly from the front end 35 of each skid 34 for guiding a bale 4 onto the tubes 32 and 33.

Figure 1:
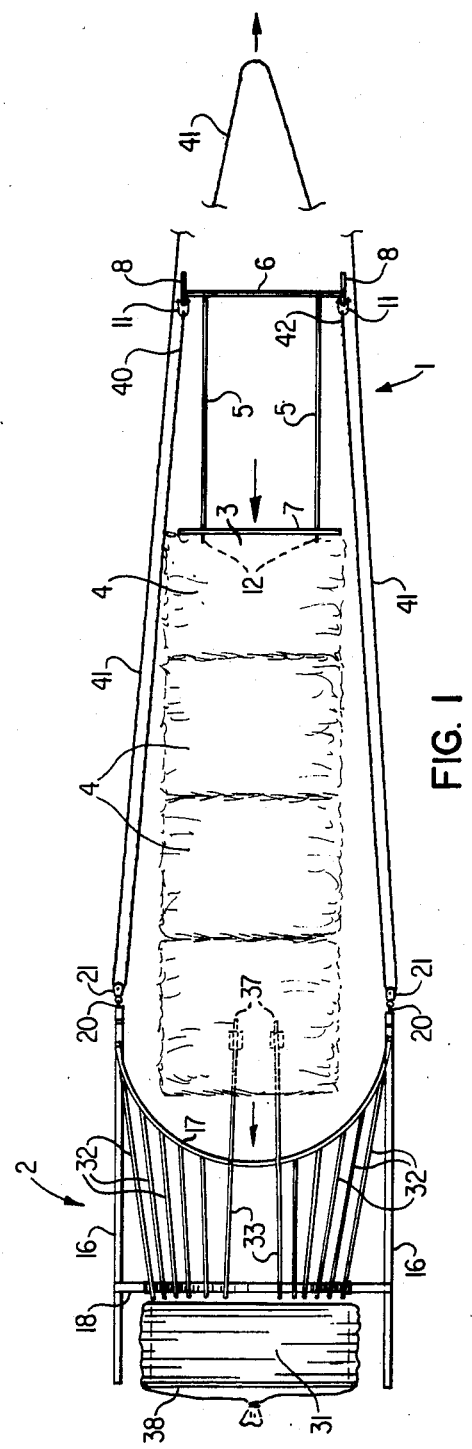
FIG. 1 is a schematic plan view of an apparatus in accordance with the present invention in use.
Figure 6:
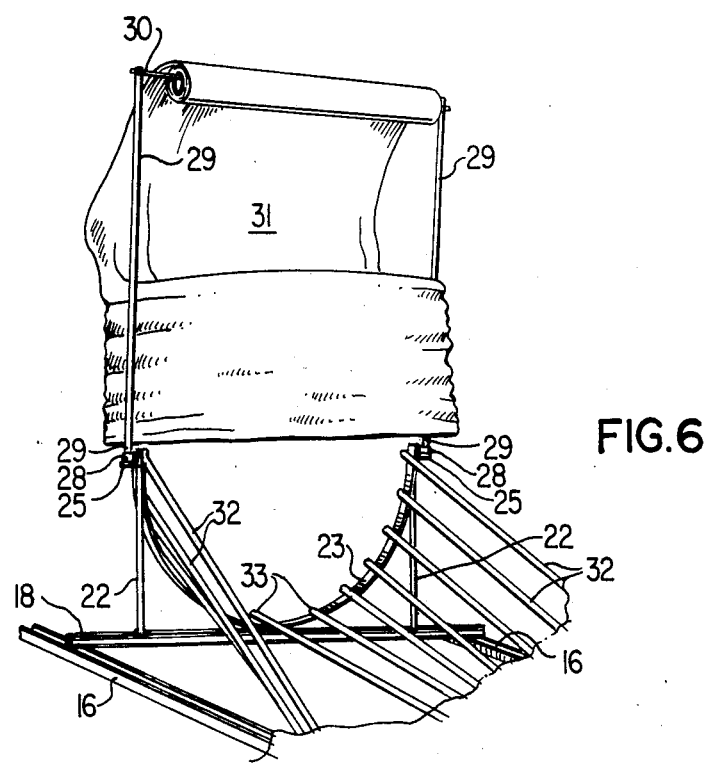
FIG. 6 is a perspective view of the rear portion of the frame of FIGS. 3 to 5 in use.

In use, an elongated plastic bag 31 is unrolled from the shaft 30 onto the cylinder 24, which is in the vertical position (FIG. 6). The cylinder 24 and the bag 31 are rotated to the horizontal position, and a metal hoop 38 (FIGS. 5 and 6) is slid onto the grooved end 39 of the cylinder 34 to hold the bag 31 on the cylinder. The posts 29 and the shaft can be removed, or left in position until the bales 4 are partially loaded into the bag 31. With reference to FIG. 1, one end 40 of a cable or rope 41 is connected to one of the shackles 11. The cable 41 is looped around one pulley 21 on the same side of the row of hay bales 4, brought forward, looped around the trailing end of a tractor draw bar (not shown) or another towing vehicle, brought rearwardly around the other pulley 21, and then brought forwardly, the other end 42 being connected to the other shackle 11.

When the towing vehicle is driven forward, the cable 41 is pulled on both sides of the bales 4 to cause the frame 2 to move in a forward direction. The teeth 8 tend to dig into the ground retarding rearward movement of the frame 1. In any event, the frames 1 and 2 are moved towards each other to pull the rear frame 2 beneath the bales 4. In fact, the bales 4 are maintained more or less stationary, while the bag 31 on the cylinder 24 moves forwardly around the bales which is easier than pushing the heavy row of bales 4 into a stationary bag.

It will be appreciated that the apparatus described hereinbefore can be used to load one bale 4 or a long row of bales into a bag. As each bale 4 is loaded into the bag, the bale drops behind the frame 1 and the cylinder 24, the ramp defined by the guides 32 and 33 raising one end of the next bale 4 and guiding such bale through the cylinder 4 into the bag 31.

Thus, there has been defined an apparatus, which while relatively simple in terms of structure, is efficient in terms of quick and easy loading of bales into a plastic bag. Of course, while the apparatus described herein is specifically designed for round bales, a slightly modified apparatus can be used with bales of any shape.

What we claim is:

1. An apparatus for loading a bale into an elongated plastic bag comprising front frame means abutting one end of a row of aligned bales, rear frame means for supporting a plastic bag in a forwardly opening position for receiving a bale, cable and pulley means connecting said front and rear frame means for drawing said front and rear frame means toward each other and thereby drawing a bale around one of said bales, said front frame means including pin means for penetrating a bale and tooth means for penetrating the ground and thereby retarding movement of said front frame means toward said rear frame means.

2. An apparatus according to claim 1, wherein said rear frame means includes chute means for guiding a bale through said rear frame means; and cylinder means for holding the open end of a bag in the open position for receiving the bale from the chute means as the rear frame means is moved towards said front frame means.

3. An apparatus according to claim 2, wherein said rear frame means includes a skid means, post means for supporting the rear end of said chute means and for pivotally supporting said cylinder means for rotation between a bag receiving vertical position and a horizontal position in which the bag is aligned with said chute means for receiving the bale.

4. An apparatus according to claim 3, wherein said chute means is inclined forwardly.

5. An apparatus according to claim 3, wherein said rear frame means includes a pair of parallel skids, said cable and pulley means including a pulley on the front end of each skid.

* * * * *